US007890536B2

(12) United States Patent
Draeger et al.

(10) Patent No.: US 7,890,536 B2
(45) Date of Patent: Feb. 15, 2011

(54) GENERATING TEMPLATES OF NODES TO STRUCTURE CONTENT OBJECTS AND STEPS TO PROCESS THE CONTENT OBJECTS

(75) Inventors: David Robert Draeger, Rochester, MN (US); Howard Justin Glaser, San Jose, CA (US); Matthew Scott Davis, Durham, NC (US); James Andrew McCright, Rochester, MN (US); Russell Blake Wright, Bar Harbor, ME (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 11/614,925

(22) Filed: Dec. 21, 2006

(65) Prior Publication Data
US 2008/0154935 A1 Jun. 26, 2008

(51) Int. Cl.
*G06F 17/30* (2006.01)
*G06F 7/00* (2006.01)
(52) U.S. Cl. .................. 707/793; 715/762; 707/803; 705/8
(58) Field of Classification Search .......... 707/790, 707/999.102; 715/762
See application file for complete search history.

(56) References Cited

U.S. PATENT DOCUMENTS

| | | | | |
|---|---|---|---|---|
| 5,718,746 | A * | 2/1998 | Nagasawa et al. | 106/31.9 |
| 5,784,583 | A * | 7/1998 | Redpath | 715/841 |
| 6,381,611 | B1 | 4/2002 | Roberge et al. | |
| 6,766,316 | B2 | 7/2004 | Caudill et al. | |
| 2002/0032688 | A1 * | 3/2002 | Serrano-Morales et al. | 707/104.1 |
| 2003/0046382 | A1 * | 3/2003 | Nick | 709/224 |
| 2004/0210829 | A1 * | 10/2004 | Cristofari et al. | 715/501.1 |

(Continued)

OTHER PUBLICATIONS

Ipeirotis, P.G., E. Agichtein, P. Jain, and L. Gravano, "To Search or to Crawl! Towards a Query Optimizer for Text-Centric Tasks", Proceedings of the 2006 ACM SIGMOD International Conference on Management of Data, 2006, pp. 265-276.

(Continued)

*Primary Examiner*—John R. Cottingham
*Assistant Examiner*—Nicholas E Allen
(74) *Attorney, Agent, or Firm*—David W. Victor; Konrad Raynes & Victor LLP (57) ABSTRACT

Provided are a method, system, and article of manufacture for generating templates of nodes to structure content objects and steps to process the content objects. A template is generated having a plurality of first level nodes representing a flow of tasks. A set of second level nodes representing a flow of steps is generated for at least one of the first level nodes to collectively perform the task represented by the first level node. A content object including information for a step represented by the node is associated with at least one node in the second level. Links are generated among the first level nodes and in each set of second level nodes indicating a logical ordering of the nodes and a direction of the flow of the tasks represented by the first level nodes and the flow of steps represented by the second level nodes. An end-user graphical user interface is generated from the generated nodes and links to direct an end user through the flow of tasks and steps represented by the nodes.

32 Claims, 6 Drawing Sheets

U.S. PATENT DOCUMENTS

| | | |
|---|---|---|
| 2005/0120009 A1 | 6/2005 | Aker |
| 2005/0160398 A1* | 7/2005 | Bjornson et al. ............ 717/104 |
| 2005/0195797 A1* | 9/2005 | Kryuchkov et al. ......... 370/352 |
| 2005/0234963 A1* | 10/2005 | Capps et al. ................ 707/102 |
| 2006/0053043 A1* | 3/2006 | Clarke .......................... 705/8 |
| 2006/0106846 A1* | 5/2006 | Schulz et al. ............... 707/101 |
| 2007/0100782 A1* | 5/2007 | Reed et al. .................... 707/1 |

OTHER PUBLICATIONS

Jain, A.K., M.N. Murty, and P.J. Flynn, "Data Clustering: A Review", ACM Computer Surverys, vol. 31, No. 3, Sep. 1999, pp. 264-323.

* cited by examiner

GENERATING TEMPLATES OF NODES TO STRUCTURE CONTENT OBJECTS AND STEPS TO PROCESS THE CONTENT OBJECTS

BACKGROUND OF THE INVENTION

1. Field

The present invention relates to a method, system, and article of manufacture for generating templates of nodes to structure content objects and steps to process the content objects.

2. Description of the Related Art

Independent units of information are unstructured in nature. Relationships and structure are introduced when the information units are presented in a logical order. Certain software programming techniques may be used to provide structure to unstructured information and processes, such as a workflow program that is used to generate a workflow process indicating specific operations performed at different nodes in a workflow, a database, and the use of hyperlinks in hypertext documents to link together documents in a logical ordering, etc. Once the structure is defined for the information and pages, it may be difficult to update or modify the structure and design, such as the case with linked hypertext documents providing linked pages of a user interface.

There is a need in the art for improved techniques to allow a developer to define structure for content objects and documents and processes used to process the documents and content objects, and use the documents and content objects for other technical or business processes.

SUMMARY

Provided are a method, system, and article of manufacture for generating templates of nodes to structure content objects and steps to process the content objects. A template is generated having a plurality of first level nodes representing a flow of tasks. A set of second level nodes representing a flow of steps is generated for at least one of the first level nodes to collectively perform the task represented by the first level node. A content object including information for a step represented by the node is associated with at least one node in the second level. Links are generated among the first level nodes and in each set of second level nodes indicating a logical ordering of the nodes and a direction of the flow of the tasks represented by the first level nodes and the flow of steps represented by the second level nodes. An end-user graphical user interface is generated from the generated nodes and links to direct an end user through the flow of tasks and steps represented by the nodes.

DETAILED DESCRIPTION

Figure 1:
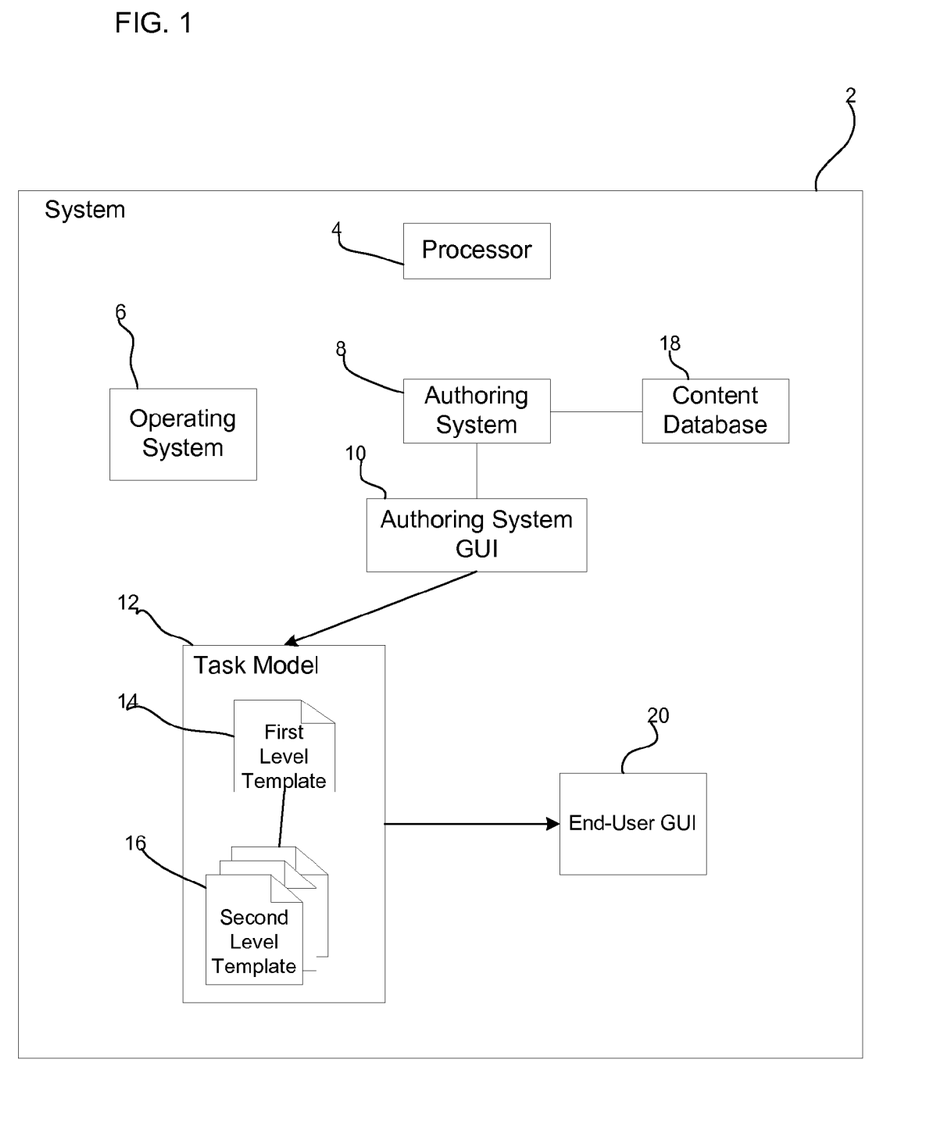
FIG. 1 illustrates an embodiment of a computing environment.

FIG. 1 illustrates a computing environment in which embodiments may be implemented. A system 2 includes a processor 4 and operating system 6. The operating system 6 implements a runtime environment in which programs, such as an authoring system 8, run. The authoring system 8 generates an authoring system graphical user interface (GUI) 10 to enable a developer to generate a structured flow or organization of content and steps for an end user to perform with respect to the content objects. Authoring GUI 10 generates a task model 12 comprising a first level template 14 having multiple nodes representing tasks to perform as part of the task model. One or more of the nodes representing the tasks may have an associated second level template 16. Each second level template 16 has multiple nodes representing a flow of steps to perform to implement the task associated with the second level template 16. The developer, using the authoring GUI 10, may associate a content object with one or more of the nodes of the second level templates 16. A content object may comprise a text document, file, executable program, etc. The content object may comprise a hypertext document including hypertext links to programs or pages of additional information, such as a help or Frequently Asked Questions (FAQ) page.

In one embodiment, each second level node may include a content object providing a control button to enable the user to proceed to a next step in the flow of steps. The templates 14 and 16 and content objects associated with the second level nodes may be stored in a content database 18. Although two levels of templates are described, there may be any number of levels of templates linking to each other where each second and further level of templates may provide content objects, steps and links to further levels of templates to perform certain steps and provide additional content objects in the flow of operations.

The developer may generate pages from the templates 14 and 16 for the task model 12 to form an end user graphical user interface (GUI) 20, where the templates and nodes are converted to pages through which the end user may progress according to the flow of operations of the nodes in the first and second level templates. The end user GUI 20 may be stored in a program that may be deployed to end users to perform the steps and review the content generated into the end user GUI 20. Further, the generated task model 12 may be stored and archived for further editing or later use. Yet further, the task model 12, comprising the first 14 and second 16 level templates, may be supplied to another application to consume. Such other applications receiving the task model 12 may run the flow of operations and consume the content objects represented in the templates 14 and 16.

Figure 2:
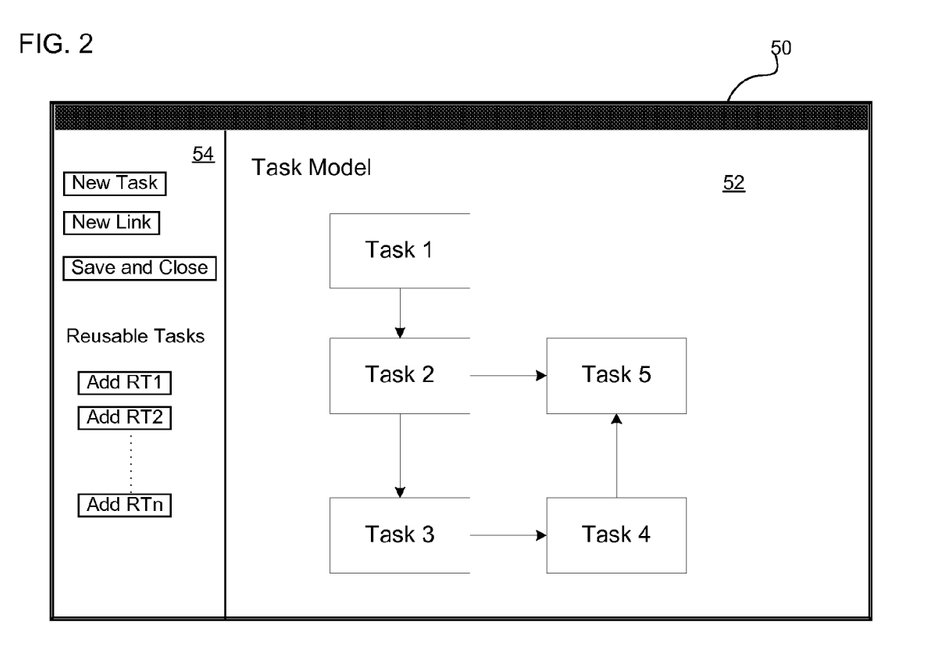
FIGS. 2 and 3 illustrate embodiments of templates having first and second level nodes.

FIG. 2 illustrates an instance of the authoring GUI 50 rendering a first level node template 52 having graphical shapes, e.g., boxes, representing task nodes, including Task 1, Task 2 ... Task 5. The lines between the task nodes represent the flow of the tasks 1, 2 ... 5 that collectively comprise a task model representing an overall task to accomplish, such as diagnose a technical problem with a device or program, perform a set of organizational operations to complete an overall business or technical task, process content objects, provide a guided tutorial through steps rendering the content objects, etc. The flows may provide an explanation without branching through the use of questions and answers or a flow that branches to other flows and levels of templates and content objects based on user answers to questions. An editor pane 54 includes task buttons, such as "New Task" that enables the developer to add a task box to the template 52, a "New Link"

button to add a line connecting two tasks indicating a flow of operations from one task to another, and a "Save and Close" button to save the task model. The editor pane 54 further includes reusable tasks ("RT"), e.g., RT1, RT2 . . . RTn, that may be added to the first level node template 52. A reusable task comprises a task node that may be added to the first level template 52. Adding a reusable task node also adds the second level template associated with the reusable task node to the task model being generated.

Figure 3:
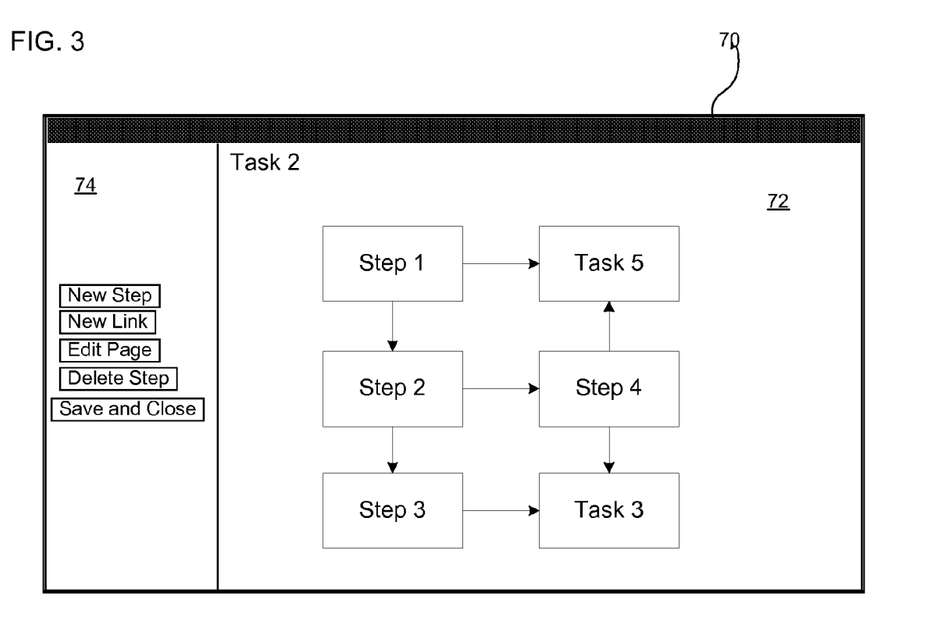

FIG. 3 illustrates an instance of the authoring GUI 70 rendering a second level node template 72 having the steps representing operations to perform for an associated task, e.g., Task 2 in the example of FIG. 3, in the first level node template 52. The editor pane 74 includes a "New Step" button that enables the user to add graphical shapes, e.g., boxes, representing steps to perform and a "New Link" button that that allows the user to draw lines to define a logical ordering of the step nodes. The "Edit Pages" button allows the user to edit a content page associated with each step node. In the content page for the step nodes, the user may include information on operations for the user to perform for that step and include links or information on programs to run to perform the operations for that step. The end result steps or end steps may correspond to tasks in the first level template 52, such as tasks 3 and 5. This provides a flow of operations from a final step in a second level template 74 for a first level node, such as Task 2 in the first level template 52, to a subsequent first level node or Task, e.g., Tasks 3 or 5, according to the flow in the first level template 52.

The developer may further use the authoring GUI 10 to add metadata for the links and nodes, such as a label for the link or node, a description of the link or node, and design notes. This metadata assists the developer in editing the flows defined in the templates and documenting the templates.

With the described embodiments, the user may associate any type of content object with a step in the second level template 72, such as a text document, executable program, etc.

Figure 4:
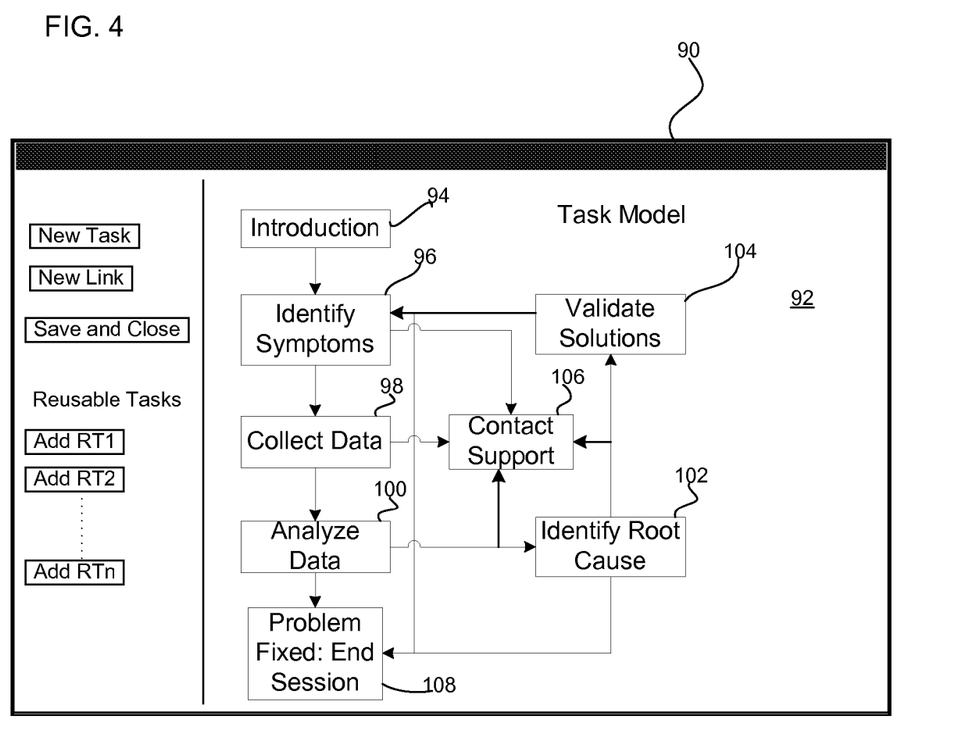
FIGS. 4 and 5 illustrate additional embodiments of templates having first and second level nodes.

FIG. 4 illustrates an embodiment of an authoring GUI 90 implementation rendering a first level template 92 including task nodes providing a structure flow of tasks to diagnose a device or program. The tasks and flow comprise an introduction task 94, an identify symptoms task 96 to determine the symptoms or observable problems with the device being diagnosed, a collect data task 98 to collect data on device operations, an analyze data task 100 to analyze the collected data, an identify root cause task 102 to determine the problem with the device, and a validation solution task 104 to determine whether the solution is tenable. Moreover, many of the tasks may segue to a contact technical support task 106. The node for the contact technical support task 106 may comprise a content page having contact information for technical support. Further, many steps, such as steps 96, 100, 102, 104, may proceed to a problem fixed task 108 indicating an end to the flow.

Figure 5:
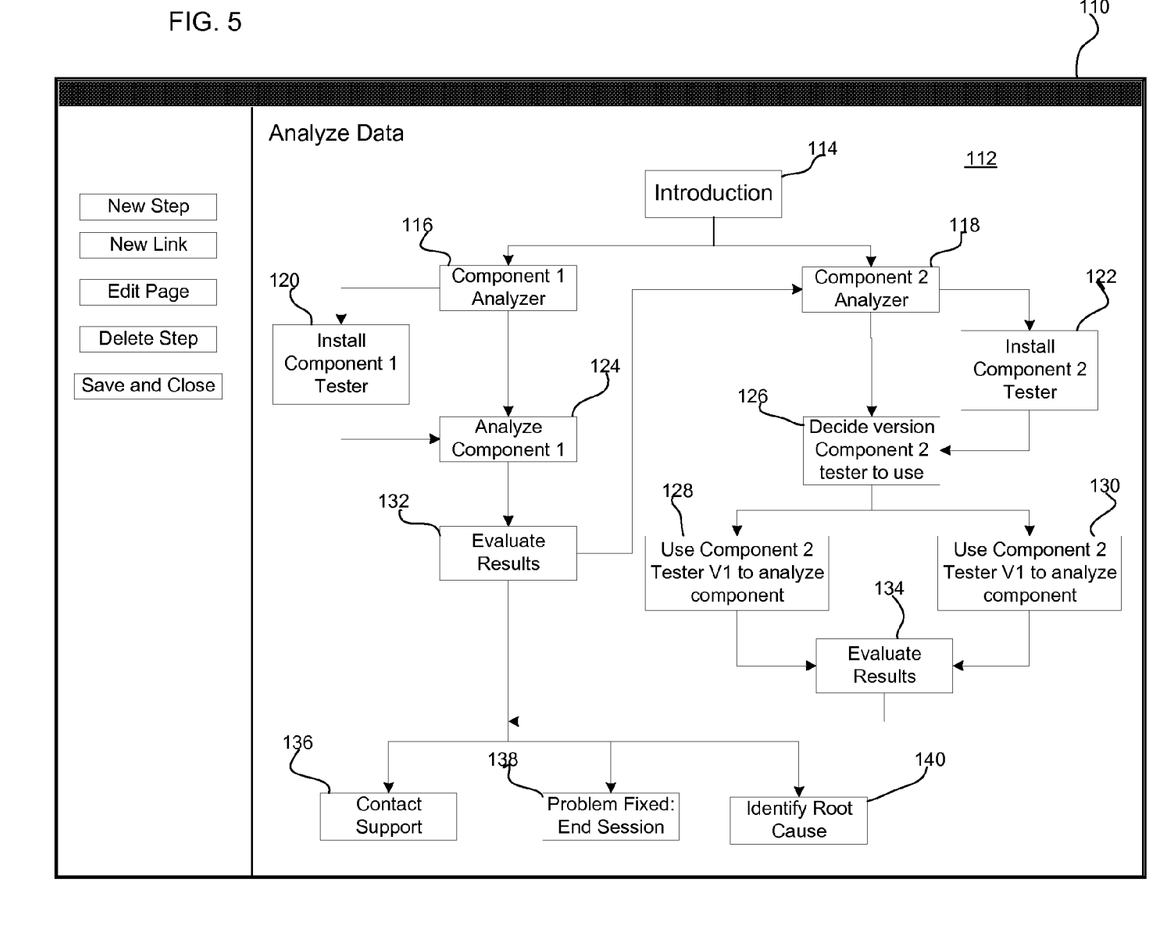

FIG. 5 illustrates an embodiment of an instance of the authoring GUI 110 including the second level template 112 of nodes representing steps to perform for the first level analyze data task 100 (FIG. 4). From an introduction step 114, the step flow may proceed to test one of two components in the device or program being diagnosed. Each component analyzer step 116, 118 allows the user to install a different component tester at an installation step 120, 122. For component 1, the user may proceed to the installation step 120. At the analyze component 1 step 124, the user may be presented an associated content page with a link to allow the user to launch the component 1 tester or provide written instructions on how the user may analyze component 1. For component 2, the step flow proceeds to installation step 122 and/or to a decide version step 126 at which the end user may decide to proceed to steps 128 or 130 to use one of the two different versions of component 2 tester to analyze the component 2. After analyzing the components, the user may proceed to an evaluation step 132 or 134 to evaluate the results. The step node 132, 134 includes content pages including information to assist the user in analyzing the problem and allowing the user to select a next step in the flow, such as contact support 136, end session 138, identify the root cause 140. The end steps 136, 138, and 140 correspond to first level tasks 106, 108, and 102, respectively, in FIG. 4, to cause the flow to proceed to the next first level task in the task flow from the end step 136, 138 or 140 in the second level step flow.

Figure 6:
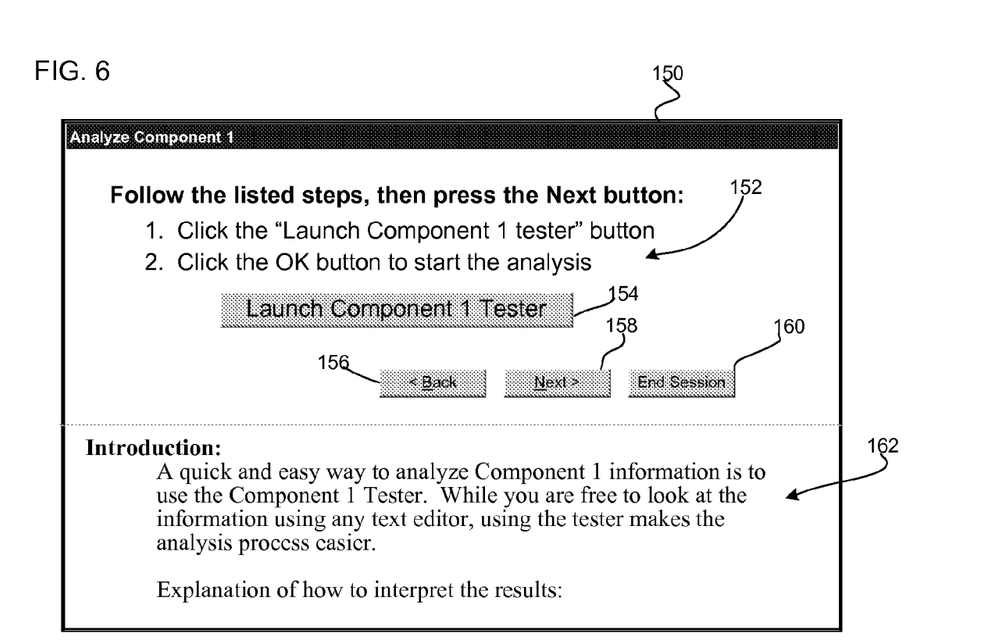
FIGS. 6 and 7 illustrate pages for an end-user graphical user interface generated from the second level nodes in the template of FIG. 5.

FIG. 6 illustrates an embodiment of a page 150 displayed in the end-user GUI 20 generated from the analyze component 1 step 124 in the developer generated second level template 110 and the content page associated with the step 124. The analyze component page 150 includes text content 152 instructing the user to select a link 154 to launch the component 1 tester program if previously installed. Selecting the back button 156 and next button 158 causes the end-user GUI 20 to proceed to the page for a previous and subsequent steps, respectively, in the flow. Selection of the end session button 160 branches to the end session task 108 (FIG. 4) in the first level flow. The text content 162 also provides an explanation of the analyze step and manual operations the end user may perform in lieu of using the component 1 tester program that can be installed at step 120.

Figure 7:
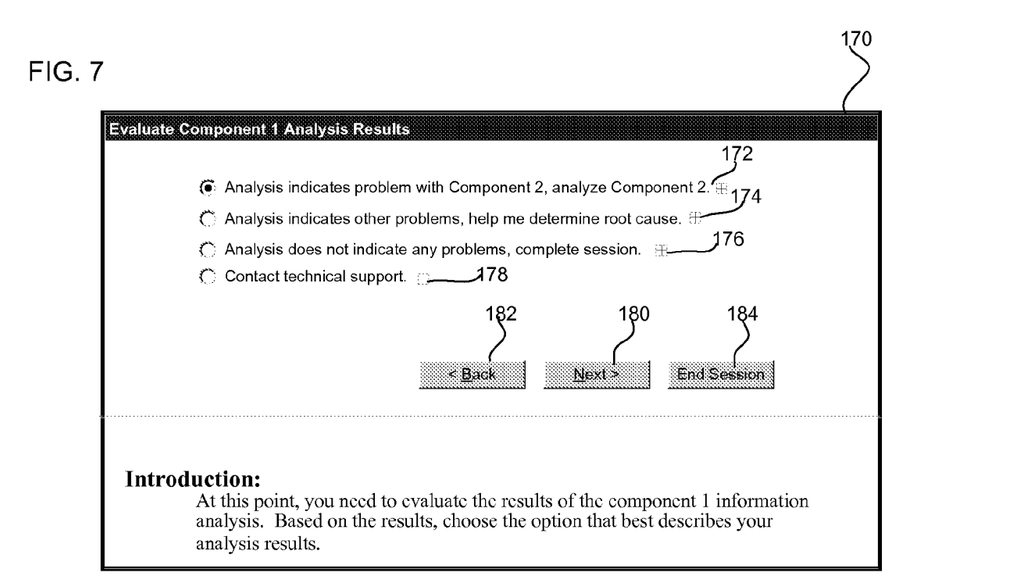

FIG. 7 illustrates an embodiment of a page 170 displayed in the end-user GUI 20 generated from a page associated with the evaluate step 132 for component 1 in the second level flow of FIG. 5. The page enables the user to select a further step 172, 174, 176, 178 corresponding to steps 118, 102, 108, and 106, respectively, in the second level step flow of FIG. 5. Further, end steps 136, 138, and 140 in the second level flow correspond to task 106, 108, and 102, respectively, in the first level task flow indicating the flow between steps and tasks in the model. Selection of one of the options 172, 174, 176, and 178 along with selection of the Next button 180 causes the flow to proceed to the next step and/or task in the flow of tasks and steps. Selection of the Back button 182 causes the end-user GUI 20 to render the content object for the previous step, which comprises the analyze component 1 step 124. Selection of the stop session button 184 causes the end-user user interface to proceed to the content page associated with the end session step 138 in FIG. 5, which corresponds to the end session task 108 in the first level task flow of FIG. 4.

Figure 8:
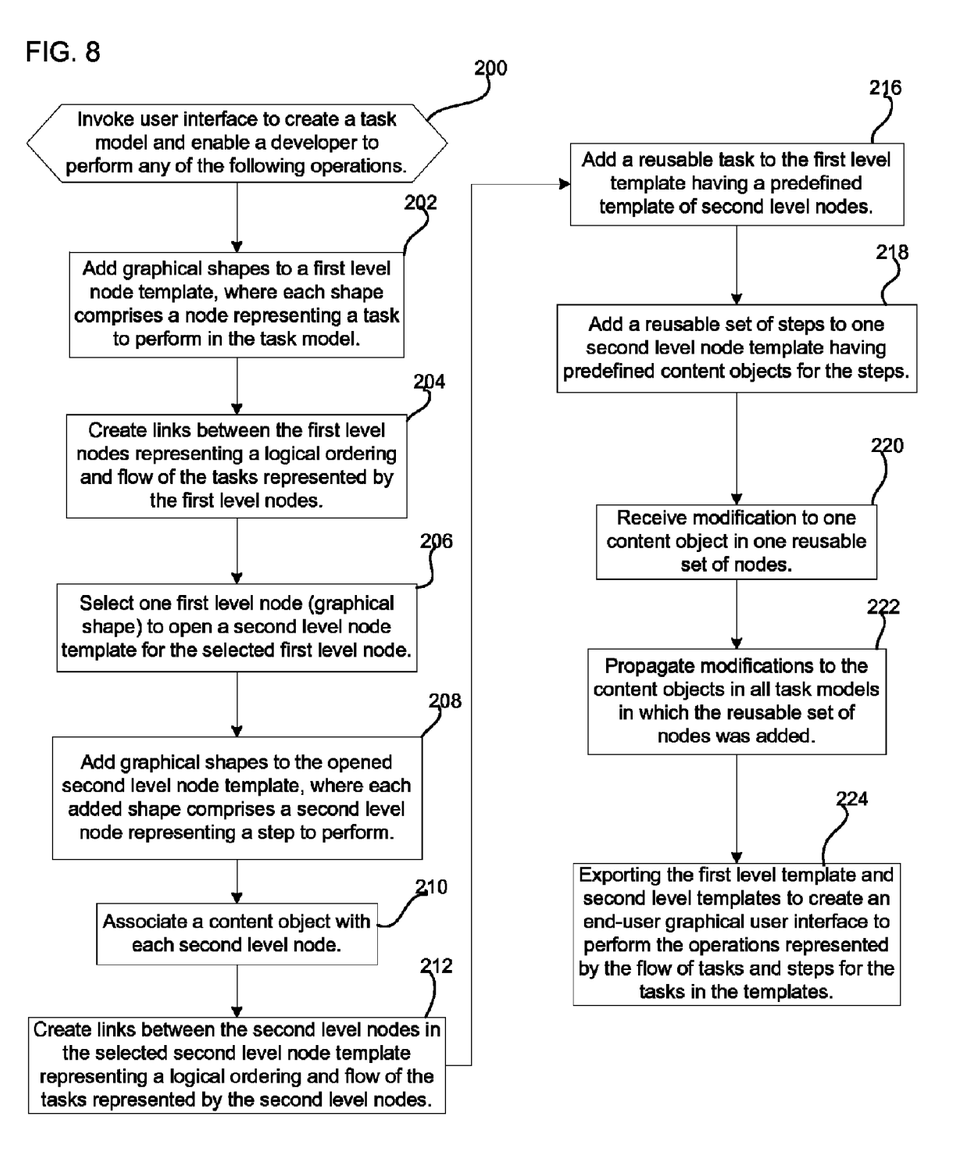
FIG. 8 illustrates an embodiment of operations to generate first and second level templates of nodes to define a flow of operations and steps with respect to content objects.

FIG. 8 illustrates an embodiment of operations performed by the authoring system 8, which provides an authoring system GUI 10 enabling the developer to create first and second level nodes and content objects for the second level nodes that associates content and operations for an end-user GUI 20. The authoring system GUI 10 is invoked (at block 200) and enables the developer to perform the operations in blocks 202-224 one or more times. The developer may use the authoring GUI 10 to add (at block 202) graphical shapes to a first level node template 52, 92, where each shape comprises a node representing a task to perform in the task model. The authoring GUI 10 may be used to create (at block 204) links between the first level nodes in the first level template 52, 92 representing a logical ordering and flow of the tasks represented by the first level nodes. The developer may select (at block 206) one first level node (graphical shape) to open a second level node template 72, 112 for the selected first level node, e.g., task 2 in first level template 52 FIG. 2 and analyze data task 100 in template 92 (FIG. 4). The authoring GUI 10 may be used to add (at block 208) graphical shapes to the opened second level node template 72, 112, where each added shape comprises a second level node representing a step to perform. A content object may be associated (at block 210) with each second level node in the opened second level node template 72, 112. A content object may comprise a file having text or hyperlinks to launch application programs or links to further pages of information. The developer may use (at block 212) the authoring GUI 10 to create links between the second level nodes in the selected second level node template 72, 112 representing a logical ordering and flow of the tasks represented by the second level nodes.

The developer may further add (at block 216) a reusable task, such as the reusable tasks in edit pane 54 (FIG. 2) to the first level template having a predefined template of second level nodes. A reusable set of steps may be added (at block 218) to one second level node template having predefined content objects for the reusable set of steps. Upon receiving (at block 220) modification to one content object in one reusable set of nodes, which may be modified via the authoring GUI 10, the authoring system 8 may automatically (at block 222) propagate modifications to the content objects in all task models in which the reusable set of nodes was added. The developer may then use (at block 224) the authoring GUI 10 to export (at block 226) the first level template 14 and second level templates 16 to create an end-user graphical user interface 20 to perform the operations represented by the flow of tasks and steps for the tasks in the templates. For instance, the authoring system 8 may convert the templates 14, 16 of nodes and their associated content objects into a series of hypertext markup language (HTML) or Extensible Markup language (XML) pages that include links to other pages according to the logical ordering represented by the links in the first level and second level templates to enable the end-user to navigate through the pages according to the logical ordering indicated in the first and second level templates. Alternatively, the templates comprising the task model may be archived, stored or otherwise provided to an application or external component.

Described embodiments provide techniques to provide multiple levels of ordering of content objects and tasks related to the processing of those content objects. The flow represented by the templates comprising the multiple levels of ordering form a task model representing an overall task to accomplish, such as diagnose a technical problem with a device or program, perform a set of organizational operations to complete an overall business or technical task, process content objects, provide a guided tutorial through steps rendering the content objects, etc. The templates and their indicated logical ordering are used to generate an end-user user interface that enables the user to proceed through a structured series of steps to process and use content objects, which may comprise documents and programs, in the logical ordering indicated in the templates. This described authoring tool allows the developer to define a structure for documents, programs and a process that may be otherwise maintained or utilized in an unstructured format.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In certain embodiments, the authoring system GUI is used to generate a flow of steps and operations to diagnose a problem with a device or programs. In alternative embodiments, the authoring system GUI may be utilized to define a flow of steps and operations with respect to content objects that is used to generate linked pages for an end-user user interface that provides structure to how the end-user may process the content objects associated with the steps defined for the second level nodes.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 6 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating a first template having a plurality of first level nodes representing a flow of tasks;
   generating for each of at least two of the first level nodes a second template having a set of second level nodes representing a flow of steps to collectively perform one of the tasks represented by the first level node in the first template for which the second template is generated;
   associating with at least one second level node in at least one of the second templates a content object including information for a step represented by the second level node;
   generating links among the first level nodes in the first template and in each set of second level nodes in each second template indicating a logical ordering of the nodes and a direction of the flow of the tasks represented by the first level nodes and the flow of steps represented by the second level nodes; and
   generating an end-user graphical user interface from the generated nodes and links to direct an end user through the flow of tasks and steps represented by the nodes in the first and second templates.

2. The method of claim 1, wherein the flow of steps in the set of second level nodes in the second templates indicates at least one end node, wherein the end node directs the flow to one first level node.

3. The method of claim 1, further comprising:
   using an authoring graphical user interface to:
      add graphical shapes to the first template representing the first level nodes;
      select one of the graphical shapes representing a first level node to access the second template for the set of second level nodes for the selected first level node; and
      add graphical shapes to the second template representing the second level nodes.

4. The method of claim 3, wherein the authoring graphical user interface is further used to:
   draw lines between the graphical shapes in the first template to represent a logical ordering and the flow of tasks represented by the first level nodes; and
   for the sets of second level nodes for the first level nodes, draw lines between the graphical shapes for the second level nodes to represent a logical ordering and the flow of steps of the second level nodes.

5. The method of claim 1, wherein a content object associated with one second level node includes at least one of textual information to instruct a user on operations to perform and a link to an executable program to run to perform the step represented by the second level node.

6. The method of claim 1, further comprising:
   generating multiple links from one node in one set of second level nodes to multiple nodes in the set of second level nodes, wherein the flow of steps to one of the second level nodes to which the one second level node links is determined by a user operation performed in the end-user graphical interface page generated for the node linking to multiple nodes.

7. The method of claim 1, further comprising:
   generating multiple links from one first level node to multiple first level nodes, wherein the flow of tasks to one of the first level nodes to which the one first level node links is determined by a user operation performed in a page rendered by the end-user graphical interface for one second level node for the first level node linking to the multiple nodes.

8. The method of claim 1, further comprising:
   generating a reusable set of nodes representing a flow of operations; and
   including the reusable set of nodes in multiple models, wherein each model comprises one template having first level nodes and sets of second level nodes for the first level nodes.

9. The method of claim 8, wherein the reusable set of nodes is a member of the set of reusable nodes comprising at least one of: a first level node and set of second level nodes and a group of second level nodes to be included in the set of second level nodes.

10. The method of claim 8, further comprising:
    modifying one content object for one second level node in the reusable set of nodes; and
    propagating the modification to the content object to each model including the reusable set of nodes.

11. The method of claim 1, wherein the flow of tasks represented by the first level nodes is directed to troubleshoot a problem with an electronic device, including:

a collect data first level node having second level nodes having a flow of steps directing the end user to collect data on the electronic device operations; and an analyze first level node having second level nodes having a flow of steps directing the end user to analyze a problem with the computer device based on the data collected according to the collect data first level node.

12. A system, comprising:

a processor; and an authoring system executed by the processor to perform operations, the operations comprising:

generating a first template having a plurality of first level nodes representing a flow of tasks;

generating for each of at least two of the first level nodes a second template having a set of second level nodes representing a flow of steps to collectively perform one of the tasks represented by the first level node in the first template for which the second template is generated;

associating with at least one second level node in at least one of the second templates a content object including information for a step represented by the second level node;

generating links among the first level nodes in the first template and in each set of second level nodes in each second template indicating a logical ordering of the nodes and a direction of the flow of the tasks represented by the first level nodes and the flow of steps represented by the second level nodes; and generating an end-user graphical user interface from the generated nodes and links to direct an end user through the flow of tasks and steps represented by the nodes in the first and second templates.

13. The system of claim 12, wherein the flow of steps in the set of second level nodes in the second templates indicates at least one end node, wherein the end node directs the flow to one first level node.

14. The system of claim 12, wherein the authoring system renders an authoring graphical user interface to enable a user to cause the authoring system to perform:

add graphical shapes to the first template representing the first level nodes;

select one of the graphical shapes representing a first level node to access the second template for the set of second level nodes for the selected first level node; and add graphical shapes to the second template representing the second level nodes.

15. The system of claim 14, wherein the authoring graphical user interface further enables the user to cause the authoring system to perform:

draw lines between the graphical shapes in the first template to represent a logical ordering and the flow of tasks represented by the first level nodes; and for the sets of second level nodes for the first level nodes, draw lines between the graphical shapes for the second level nodes to represent a logical ordering and the flow of steps of the second level nodes.

16. The system of claim 12, wherein a content object associated with one second level node includes at least one of textual information to instruct a user on operations to perform and a link to an executable program to run to perform the step represented by the second level node.

17. The system of claim 12, wherein the operations further comprise:

generating multiple links from one node in one set of second level nodes to multiple nodes in the set of second level nodes, wherein the flow of steps to one of the second level nodes to which the one second level node links is determined by a user operation performed in the end-user graphical interface page generated for the node linking to multiple nodes.

18. The system of claim 12, wherein the operations further comprise:

generating multiple links from one first level node to multiple first level nodes, wherein the flow of tasks to one of the first level nodes to which the one first level node links is determined by a user operation performed in a page rendered by the end-user graphical interface for one second level node for the first level node linking to the multiple nodes.

19. The system of claim 12, wherein the operations further comprise:

generating a reusable set of nodes representing a flow of operations; and including the reusable set of nodes in multiple models, wherein each model comprises one template having first level nodes and sets of second level nodes for the first level nodes.

20. The system of claim 19, wherein the operations further comprise:

modifying one content object for one second level node in the reusable set of nodes; and propagating the modification to the content object to each model including the reusable set of nodes.

21. The system of claim 12, wherein the flow of tasks represented by the first level nodes is directed to troubleshoot a problem with an electronic device, including:

a collect data first level node having second level nodes having a flow of steps directing the end user to collect data on the electronic device operations; and an analyze first level node having second level nodes having a flow of steps directing the end user to analyze a problem with the computer device based on the data collected according to the collect data first level node.

22. An article of manufacture implementing comprising a computer readable storage medium having code executed to cause operations to be performed, the operations comprising:

generating a first template having a plurality of first level nodes representing a flow of tasks;

generating for each of at least two of the first level nodes a second template having a set of second level nodes representing a flow of steps to collectively perform one of the tasks represented by the first level node in the first template for which the second template is generated;

associating with at least one second level node in at least one of the second templates a content object including information for a step represented by the node;

generating links among the first level nodes in the first template and in each set of second level nodes in each second template indicating a logical ordering of the nodes and a direction of the flow of the tasks represented by the first level nodes and the flow of steps represented by the second level nodes; and generating an end-user graphical user interface from the generated nodes and links to direct an end user through the flow of tasks and steps represented by the nodes in the first and second templates.

23. The article of manufacture of claim 22, wherein the flow of steps in the set of second level nodes in the second templates indicates at least one end node, wherein the end node directs the flow to one first level node.

24. The article of manufacture of claim 22, wherein the operations further comprise:

generating an authoring graphical user interface to enable a user to cause operations comprising:
  adding graphical shapes to the first template representing the first level nodes;
  selecting one of the graphical shapes representing a first level node to access the second template for the set of second level nodes for the selected first level node; and
  adding graphical shapes to the second template representing the second level nodes.

25. The article of manufacture of claim 24, wherein the authoring graphical user interface further enables the user to cause operations comprising:
  drawing lines between the graphical shapes in the first template to represent a logical ordering and the flow of tasks represented by the first level nodes; and
  for the sets of second level nodes for the first level nodes, drawing lines between the graphical shapes for the second level nodes to represent a logical ordering and the flow of steps of the second level nodes.

26. The article of manufacture of claim 22, wherein a content object associated with one second level node includes at least one of textual information to instruct a user on operations to perform and a link to an executable program to run to perform the step represented by the second level node.

27. The article of manufacture of claim 22, wherein the operations further comprise:
  generating multiple links from one node in one set of second level nodes to multiple nodes in the set of second level nodes, wherein the flow of steps to one of the second level nodes to which the one second level node links is determined by a user operation performed in the end-user graphical interface page generated for the node linking to multiple nodes.

28. The article of manufacture of claim 22, wherein the operations further comprise:
  generating multiple links from one first level node to multiple first level nodes, wherein the flow of tasks to one of the first level nodes to which the one first level node links is determined by a user operation performed in a page rendered by the end-user graphical interface for one second level node for the first level node linking to the multiple nodes.

29. The article of manufacture of claim 22, wherein the operations further comprise:
  generating a reusable set of nodes representing a flow of operations; and
  including the reusable set of nodes in multiple models, wherein each model comprises one template having first level nodes and sets of second level nodes for the first level nodes.

30. The article of manufacture of claim 29, wherein the reusable set of nodes is a member of the set of reusable nodes comprising at least one of: a first level node and set of second level nodes and a group of second level nodes to be included in the set of second level nodes.

31. The article of manufacture of claim 29, wherein the operations further comprise:
  modifying one content object for one second level node in the reusable set of nodes; and
  propagating the modification to the content object to each model including the reusable set of nodes.

32. The article of manufacture of claim 22, wherein the flow of tasks represented by the first level nodes is directed to troubleshoot a problem with an electronic device, including:
  a collect data first level node having second level nodes having a flow of steps directing the end user to collect data on the electronic device operations; and
  an analyze first level node having second level nodes having a flow of steps directing the end user to analyze a problem with the computer device based on the data collected according to the collect data first level node.

* * * * *